(12) United States Patent  
Mackiewicz

(10) Patent No.: US 7,731,001 B1
(45) Date of Patent: Jun. 8, 2010

(54) DISC BRAKE

(75) Inventor: John E Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 783 days.

(21) Appl. No.: 11/466,563

(22) Filed: Aug. 23, 2006

(51) Int. Cl.
*F16D 65/54* (2006.01)

(52) U.S. Cl. ..................... 188/71.8; 188/72.3

(58) Field of Classification Search .................. 188/370, 188/72.3, 72.4, 71.8
See application file for complete search history.

(56) References Cited

U.S. PATENT DOCUMENTS

| 3,113,643 | A | | 12/1963 | Botterill | |
|---|---|---|---|---|---|
| 3,421,604 | A | | 1/1969 | Hobbs | |
| 3,575,268 | A | * | 4/1971 | Kimata | 188/196 P |
| 4,039,053 | A | * | 8/1977 | Meyer et al. | 188/73.45 |
| 4,053,030 | A | * | 10/1977 | Bainard et al. | 188/71.8 |
| 4,381,047 | A | * | 4/1983 | Gregoire et al. | 188/71.8 |
| 4,524,850 | A | * | 6/1985 | Reinecke et al. | 188/71.8 |
| 4,809,821 | A | | 3/1989 | Fulmer | |
| 5,713,435 | A | | 2/1998 | Schneider et al. | |
| 5,826,681 | A | | 10/1998 | Kubo et al. | |

\* cited by examiner

*Primary Examiner*—Bradley T King
(74) *Attorney, Agent, or Firm*—Maginot, Moore & Beck

(57) ABSTRACT

A retraction arrangement for moving a piston in a bore of a caliper to a position of rest after each brake application. The retraction arrangement includes a cylindrical body with a plurality of inward projecting fingers that engage and apply a radial spring force on the piston. Each finger is defined by a cylindrical section that transitions into a first arcuate section that transitions into a radial section that transition into a second arcuate section that engages the piston. The second arcuate section moves with the piston during a brake application causing the fingers to pivots with respect to the cylindrical body resulting in a decrease in the radial spring force while creating an increasing axial spring force in each finger. On termination of the brake application, the axial spring force returns the piston to the position of rest to establish a running clearance between a friction member and the rotor.

12 Claims, 5 Drawing Sheets

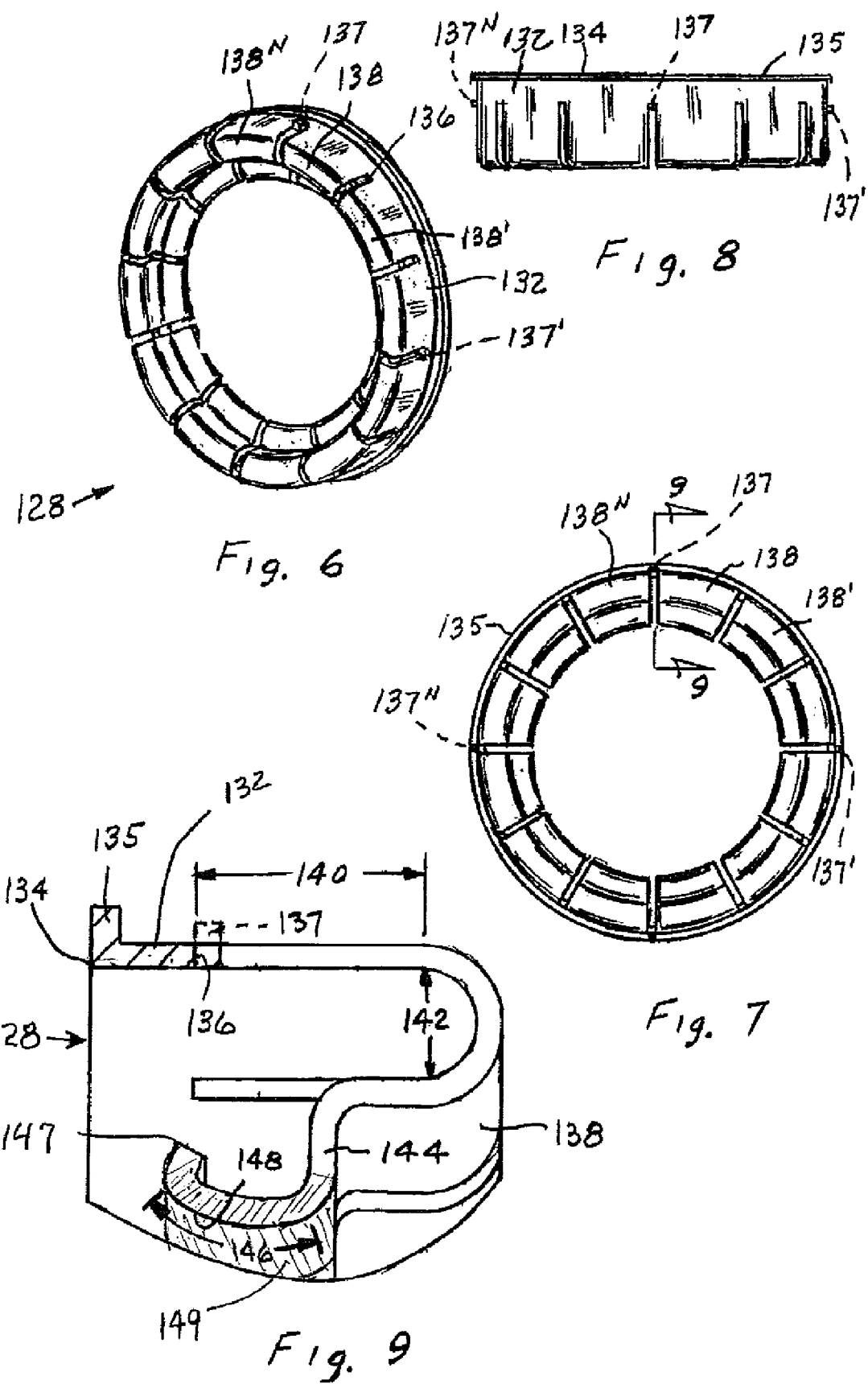

DISC BRAKE

This invention relates to a retraction arrangement wherein a plurality of fingers apply a radial spring force on a piston of a caliper in a position of rest such that the radial spring force decreases as the fingers and piston move toward a rotor during a brake application while creating an axial spring force in the fingers that acts on and returns the piston to the position of rest on termination of the brake application.

BACKGROUND OF THE INVENTION

In disc brakes, it is common for a caliper to straddle a rotor that is fixed to an axle of a vehicle with the caliper being located on a stationary member that is secured to the housing of the vehicle. The caliper has a housing with a bore therein which holds an actuation piston and a square seal is located in a groove in the housing that engages the piston to seal the bore and define an actuation chamber. A first friction member is connected to the actuation piston and a second friction member is connected to an arm extending from the caliper. The first and second friction members are located on opposite sides of the rotor and when pressurized fluid is supplied to the actuation chamber, the piston and caliper move in such a manner that the first and second friction members engage the rotor to effect a brake application. The following U.S. patents are illustrative of disc brake and their corresponding functional operation: U.S. Pat. Nos. 3,113,643; 3,421,604; 4,530,423; 4,809,821; 5,713,435; and 5,826,681. All of the disc brakes disclosed by these patents while possessing different structural components operate in a similar manner to effect a brake application in a manner as describe above and in returning the piston to a position of rest through a square seal. The square seal functions in an adequate manner, however, the square seal is in direct contact with the pressurizing fluid, maybe effected by extreme changes in temperature and may lose some internal resiliency after a period of time and as result may change or alter the time required to return the piston to a position of rest.

SUMMARY OF THE INVENTION

A primary object of the present invention is to provide a retraction arrangement that is essentially unaffected by temperature, is not in direct contact with pressurizing fluid and possess internal resiliency that is essentially unaffected by fatigue such that a piston may consistently be located in a desired position of rest after each brake application.

In more particular detail, the disc brake of the present invention includes a caliper that straddles a rotor and is retained on a stationary member of a vehicle. The caliper that straddles the rotor has a bore therein for receiving a piston to define an actuation chamber while the bore has a groove therein for retaining an o-ring that engages the piston to seal the actuation chamber from the surrounding environment. A first friction member is connected to the piston and aligned with a first side of the rotor while a second friction member is connected to the caliper and aligned with a second side of the rotor. The actuation chamber is selectively connected to a source of pressurized fluid that acts on the piston and the caliper to develop an actuation force for respectively moving the first friction member from a first position of rest into engagement with the first side of the rotor and the second friction member from a second position of rest into engagement with the second side of the rotor to effect a brake application. A retraction arrangement acts on the piston to return the first friction member to the first position of rest on termination of the brake application to define a desired running clearance between the first friction member and the first side of the rotor. The retraction arrangement is characterized by a cylindrical member that has a first end and a second end with a plurality of inward projecting fingers that extends from the second end. Each finger is defined by a cylindrical section that extends from the second end and transitions into a first arcuate section that transitions into a radial section that transitions into a second arcuate section with the second arcuate section engaging the piston to apply a radial spring force on the piston in the first position of rest. The second arcuate section of each finger moves with the piston during a brake application such that each finger pivots with respect to the second end of the cylindrical member until axial force moving the piston is greater than the radial spring force times the coefficient of friction between the second arcuate section and the piston at which time the arcuate section remains stationary and the piston may continue to move toward the first side of the rotor. As the second arcute pivots with respect to the second end, the radial spring force decreases while an internal axial spring force is created in each finger that correspondingly increases with the movement of the second arcuate section and piston from an initial position rest. When the supply of pressurized fluid to the actuation chamber is terminated, the actuation force applied to the piston also terminates and the axial spring force thereafter acts through the second arcuate section to returns the piston and correspondingly the first friction member to the first position of rest to define the running clearance between the first friction member and the first side of the rotor.

An advantage of the disc brake of the present invention resides in the use of metallic retraction member having a radial spring force and a complimentary axial spring force that act on a piston to establish a desired running clearance between a friction member and a rotor.

A further advantage of the disc brake resides in a retraction arrangement that is retained in a bore external to a pressurizing chamber for a piston and as a result is not in contact with any pressurized fluid that is supplied to move the piston in effecting a brake application.

BRIEF DESCRIPTION OF THE DRAWINGS

FIG. 6 is a perspective view of the metallic ring of the retraction arrangement of FIG. 2;

FIG. 7 is a front plan view of the metallic ring of FIG. 6;

FIG. 8 is a side plan view of the metallic ring of FIG. 6;

FIG. 9 is a sectional view taken along line 9-9 of FIG. 7;

DETAILED DESCRIPTION

Figure 1:
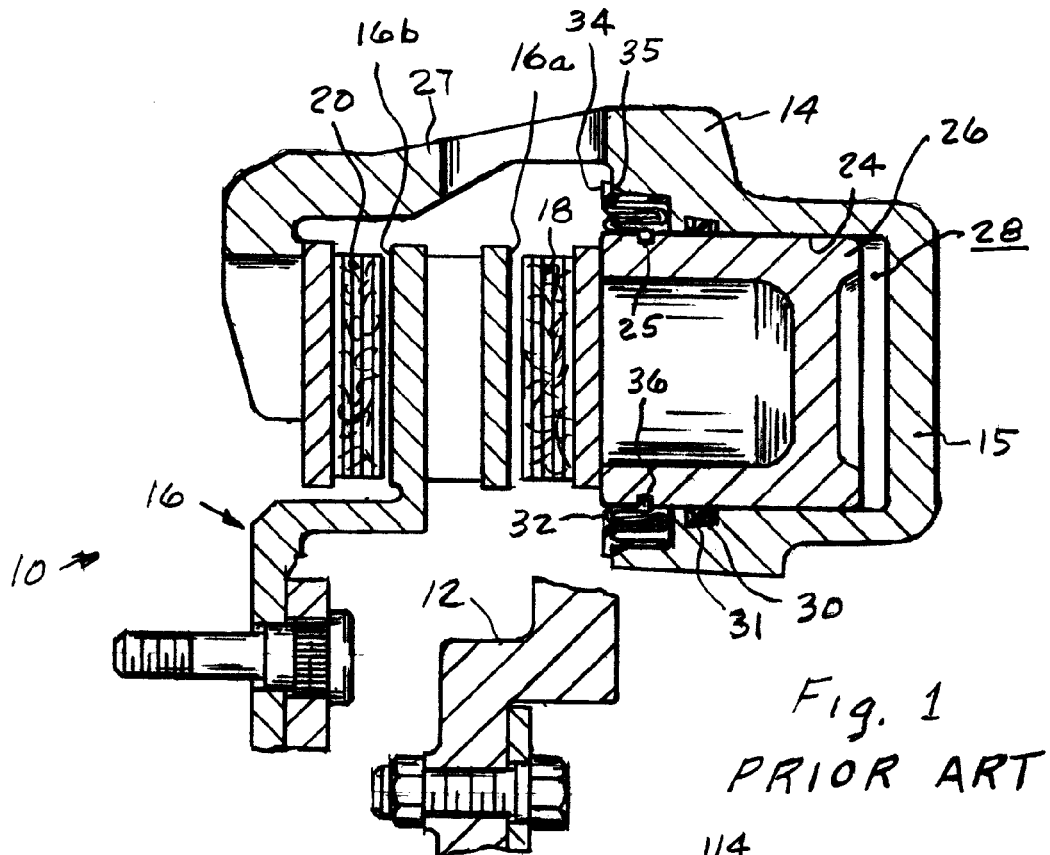
FIG. 1 is a sectional view of a disc brake of the prior art having a square seal retraction arrangement for moving a piston to a position of rest after a brake application.

The disc brake 10 illustrated in FIG. 1 is typical prior art such as exemplified in U.S. Pat. No. 5,826,681 and distinguished by an anchor 12 that is fixed to a stationary member of a vehicle with a caliper 14 that straddles a rotor 16 to position a first friction member 18 adjacent a first side 16a of the rotor 16 and a second friction member 20 adjacent a second side 16b of the rotor 16. The caliper 14 has a bore 24 therein that receives a piston 26 to define an actuation chamber 28 which is selectively connected to a source of pressurized fluid to effect a brake application. A square seal 30 that is located in a groove 31 in the housing 15 of the caliper 14, engages the peripheral surface of piston 26 with a radial force to seal the actuation chamber 28 from the surrounding environment and functions as a retraction member for piston 26 to position the piston 26 within the bore 24. A boot 32 has a first bead 34 that is located in a groove 35 in the housing 15 of the caliper 14 and a second bead 36 located in a groove 25 in the piston 26 to assist in preventing bore 24 and the peripheral surface on piston 26 from being exposed to contamination that could effect the translation of the piston 26 within the bore 24. When an operator desires to effect a brake application, pressurized fluid is selectively presented to actuation chamber 28 that acts on and moves the piston 26 and correspondingly the first friction member 18 toward the first side 16a of rotor 16 and also acts on the bottom 29 of bore 28b to move housing 15 of caliper 14 away from the rotor 16 and thereby pull second friction member 20 by way of bridge 27 toward the second side 16b of the rotor 16. The square seal 30 receives the pressurized fluid presented to the actuation chamber 28 and a portion thereof deflects such that an engagement face moves with the piston 26 toward the rotor 16 during a brake application until the coefficient of friction between the face and piston 26 times the radial internal force of the square seal 30 is overcome by a force defined by the pressure differential of the actuation force across the square seal 30 such that thereafter the piston 26 may thereafter continue to moves toward the rotor 16 while the face remains stationary and in a deflected position. On termination of the presence of pressurized fluid in the actuation chamber 28, the internal resiliency of the square seal 30 returns the face on the square seal 30 to its original square shape and as a result as face returns to an original shape, the piston 26 is returned to a position of rest. Unfortunately, after an extended period of time and when subjected to extreme changes in temperature, the material of the square seal 30 may experience material fatigue such that the internal resiliency may not react in a same manner in retracting of the piston 26 to the position of rest as rapidly or in a consistent manner as when initially installed in a disc brake 10.

Figure 2:
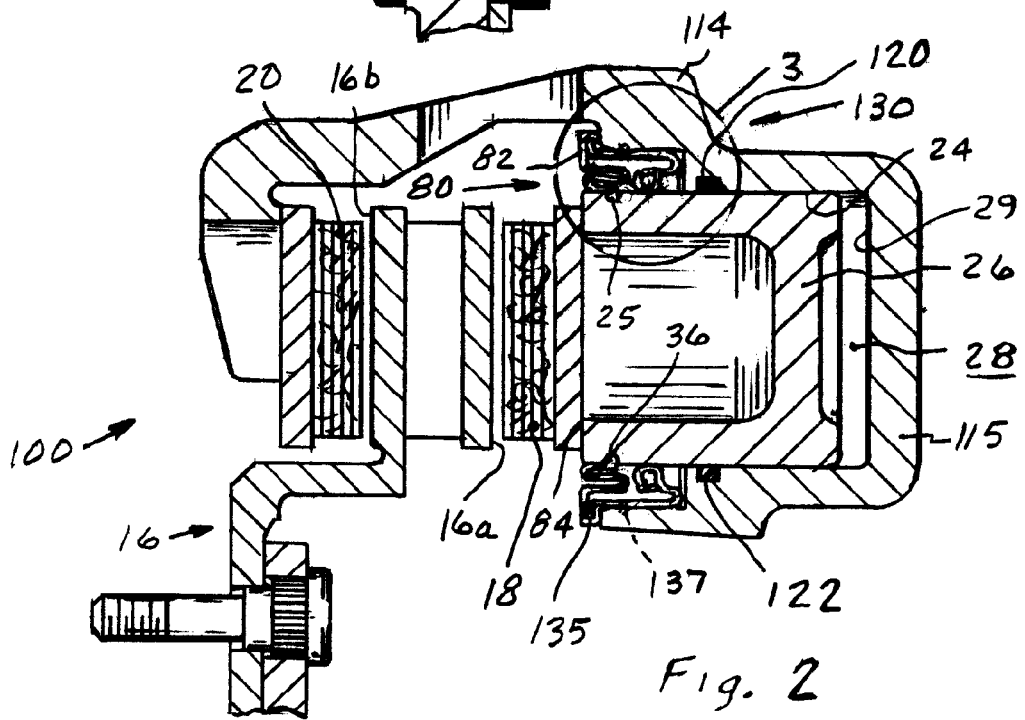
FIG. 2 is sectional view of a disc brake having a retraction arrangement made according to the present invention.

The disc brake 100 according to the present invention is illustrated in FIG. 2 and overcomes the perceived functional limitations of disc brake 10 through the retraction arrangement 130.

In disc brake 100 is identical to disc brake 10 with the exception of the components associated with the retraction arrangement 130 and the common components thereof are identified by the same number.

Figure 3:
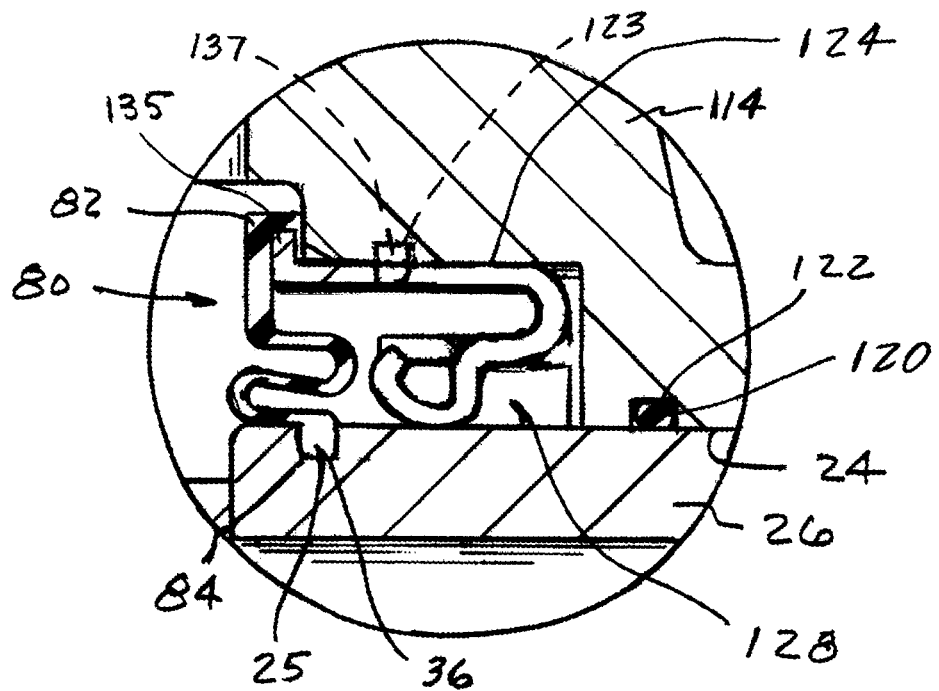
FIG. 3 is an enlarged sectional view of the circumscribed section 3 of FIG. 2 of the retraction arrangement.

The retraction arrangement 130 for disc brake 110 is illustrated in FIGS. 2 and 3 and retained in housing 115 of caliper 114. The retraction arrangement 130 includes of an o-ring seal 120 that is located in groove 122, a spring retraction member 128 that is located in a first diameter 124 of bore 24 in housing 115 and a boot 80 that is connected to the spring retraction member 128 and piston 26.

In more particular detail, the spring retraction member 128 is best illustrated in FIGS. 6, 7, 8 and 9, and includes a cylindrical body 132 with a first end 134 and a second end 136 with a plurality of inward projecting fingers 138, 138' ... 138" that extends from the second end 136. Each finger of the plurality of inward projecting fingers 138, 138' ... 138" is defined by an cylindrical section 140 that extends from the second end 136 of the cylindrical body 132 and transitions into a first arcuate section 142 that transitions into a radial section 144 that transitions into a second arcuate section 146. The second arcuate section 146 has a face 148 thereon that engages the peripheral surface of piston 26 along an essentially arcuate point contact as illustrated in FIG. 2. The first end 134 of the cylindrical body 132 has an outward radial flange 135 abuts housing 115 when cylindrical body 132 is frictionally inserted and retained in a first diameter bore 124 of bore 24 as illustrated in FIGS. 2 and 3. Under some circumstances it may be advisable to have a plurality of projections or tabs 137 that extend radially outward from the second end 136 that are retained in a groove 123 in housing 115 to assist in retaining the cylindrical body 132 in the first diameter 124 of bore 24, shown as dashed lines in FIG. 3.

The spring retraction member 128 is made from spring steel and is shaped in a manner illustrated in FIG. 9 with at least the second arcuate section 146 coated with rubber 149 to prevent scratching or damage to the peripheral surface of piston 26 and to provide the peripheral surface of face 148 with a higher coefficient of friction. The first arcuate section 142 is illustrated in FIG. 3 as having a shape of one-half a circle with a first end being tangent to the cylindrical section 140 and a second end that transitioning into the radial section 144 to bring the radial section 144 into substantially perpendicular alignment with the cylindrical section 140 while the second arcuate section 146 has a shape with a varying radius that increases from the radial section 144 with an end 147 that bends back toward the cylindrical section 140. With the spring retraction member 128 located in the first diameter 124 of bore 24, the face 148 on the second arcuate section 146 engages the peripheral surface on piston 26 to apply a radial force that is normal to the axis of piston 26. Since the inward projecting fingers 138, 138' ... 138" fingers are made from spring steel the internal resilient characteristics remain substantially constant over an extended period of use and are not subject to fatigue or degradation as could occur in the prior art when rubber was the material of choice in selecting a retraction member.

Mode of Operation

Figure 4:
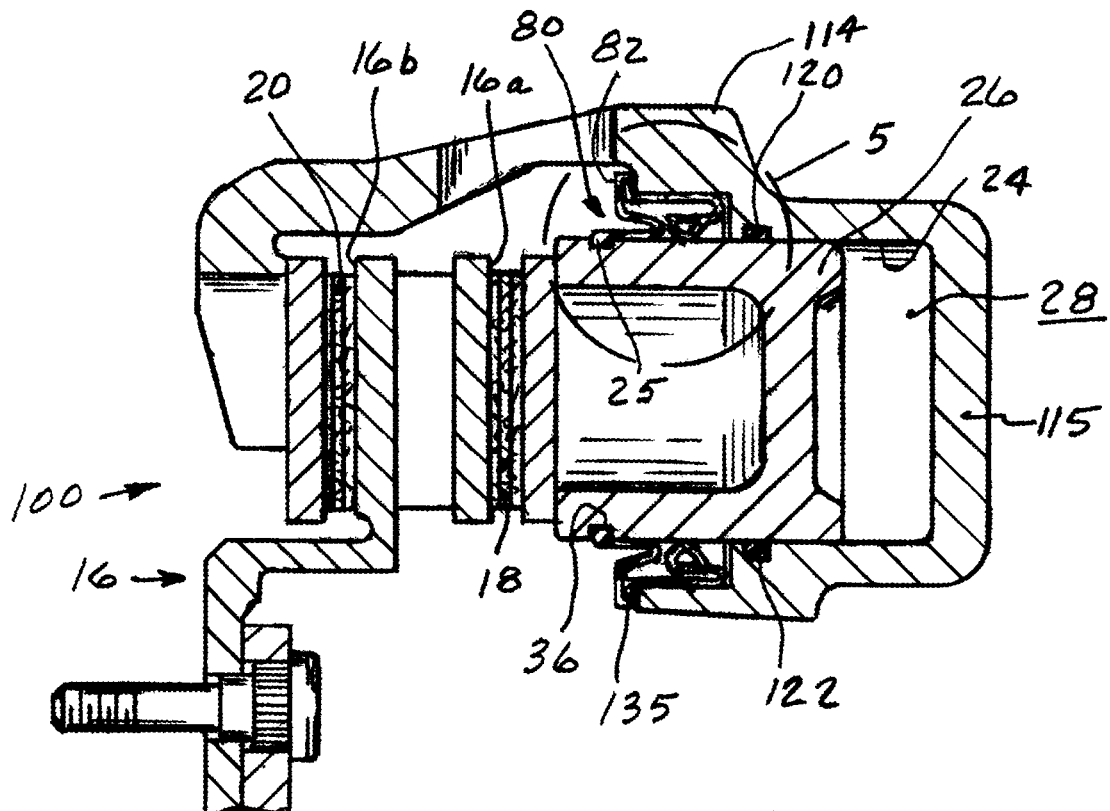
FIG. 4 is a sectional view of the disc brake of FIG. 1 during a brake application wherein the thickness of the first and second friction members have been reduced through wear.
Figure 5:
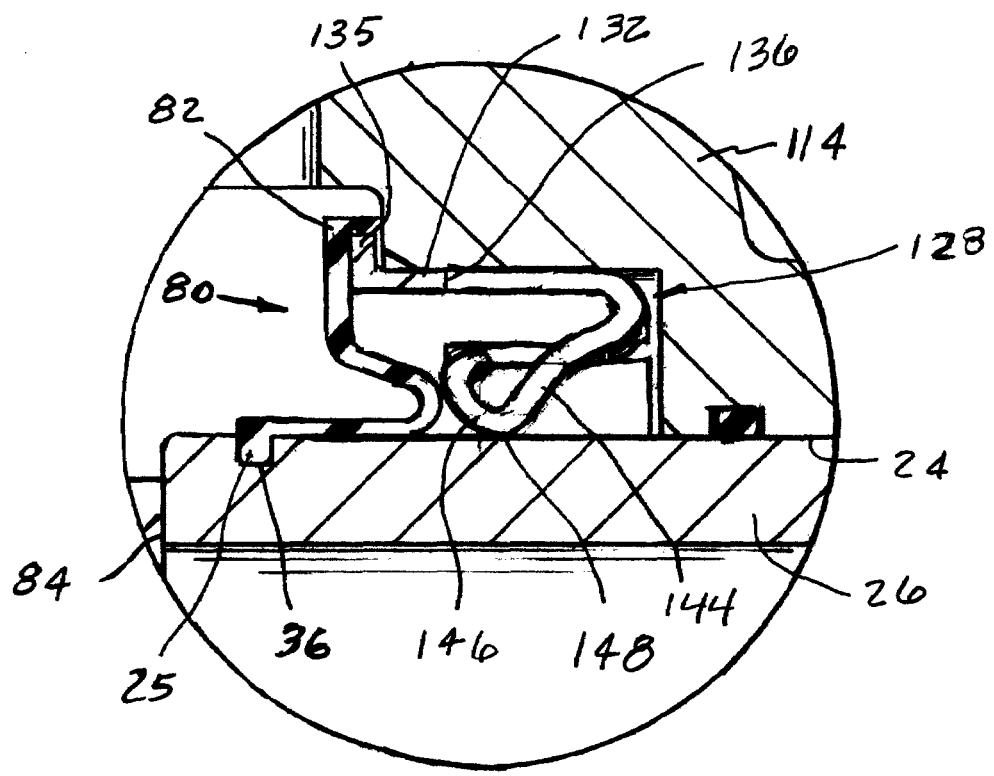
FIG. 5 is an enlarged sectional view of the circumscribed section 5 of FIG. 4.

When an operator desires to effect a brake application of a vehicle equipped with disc brake 100, pressurized fluid is selectively supplied to actuator chamber 28 that acts on piston 26 to move the first friction member 18 toward and into engagement with the first face 16a of rotor 16 and on the bottom 29 of bore 24 in housing 115 to pull the bridge and second friction member 20 toward and into engagement with the second face 16b of rotor 16 to effect a brake application, as illustrated in FIG. 4. As piston 26 moves, the radial force applied through the engagement of the second arcute section 146 of each finger of the plurality of inward projecting fingers 138, 138' ... 138" of the retraction member 128 causes the each finger to corresponding deflect and pivot about the second end 136 of the cylindrical body 132 such that the spring retraction member 128 is bent into a shape as illustrated in FIG. 5. As each finger of the plurality of inward projecting fingers 138, 138' ... 138" pivots about end 136 of the cylindrical body 132, the radial force applied through the second arcute section 146 decreases as the hypotenuse force geometry correspondingly changes with movement from the position of rest while the deflection and pivoting creates an increase in the axial geometry of each finger and as a result an axial spring force is created in each finger 138 that is a function of the movement of the piston 26. The development of the axial spring force continues and increases until the coefficient of friction between the point contact 148 and piston 26 is overcome by the actuation force moving the piston 26. The second arcuate section 146 moves with the piston 26 until an equilibrium is achieved and if the brake application dictates that piston 26 move a further distance in effecting a brake application, piston 26 independently moves thereafter. The axial spring force that is created in each finger of the plurality of fingers 138, 138' ... 138" is stored energy and on termination of the actuation force being applied to piston 26 acts on and returns the piston 26 to a desired position of rest as illustrated in FIG. 3. Thus, even though the piston may move a greater distance than the second arcuate section 146, the return of the piston 26 to a position of rest is limited to a maximum distance where the slippage occurs during a single brake application and as a result a same desired running clearance is established between the first 18 and second 20 friction members and rotor 16.

The functional relationship between the spring retraction member 128 and piston 26 may be expressed through the following formula:

$$Fa \text{ (maximum)} = Fr \times \mu$$

$$Fa = Fp - Fs$$

Where: $\mu$=the coefficient of friction between the acuate section 146 and the peripheral surface on piston 26

Fs=the force to move the first friction member 18

Fr=radial or normal spring force generated in fingers 138, 138' ... 138" acting on the piston 26

Fa=axial force (the spring retraction member's spring constant x piston displacement) generated in fingers 138, 138' ... 138" to move the piston 26 to a position of rest Fp=actuation force generated by the pressurized fluid presented to the actuation chamber 28 that is applied to piston 26.

In the rest position of the piston 26, Fs=0 and as a result Fp=Fa.

Figure 12:
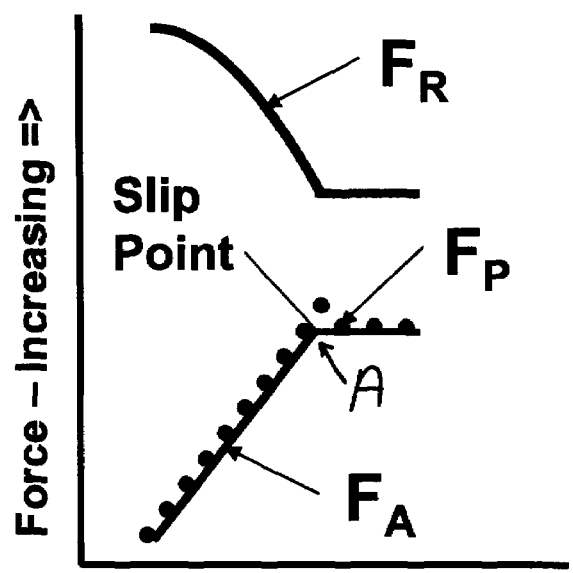
FIG. 12 is a graph illustrating a relationship that occurs in the spring retraction member during a brake application.

When piston 26 is moved toward rotor 16 by an actuation force Fp, the axial force Fa in spring retraction member 128 increases and since Fp=Fa, Fp increases as non-sliding contact is maintained between the piston 26 and spring retraction member 128 while Fr decreases in a manner as illustrated in FIG. 12. Fp and Fa with continue to be equal and increase until Fr decreases due in part to the pivoting about end 136 to a point where Fr×μ or Fa becomes less than Fp. At this point A, piston 26 will slide past the contact point on face 148 on the second arcuate section 146 to provide wear adjustment for the first friction member 18 and a new position of rest for piston 26 corresponding to the amount of slippage such that the running clearance is thereafter maintained in a desired range.

Figure 10:
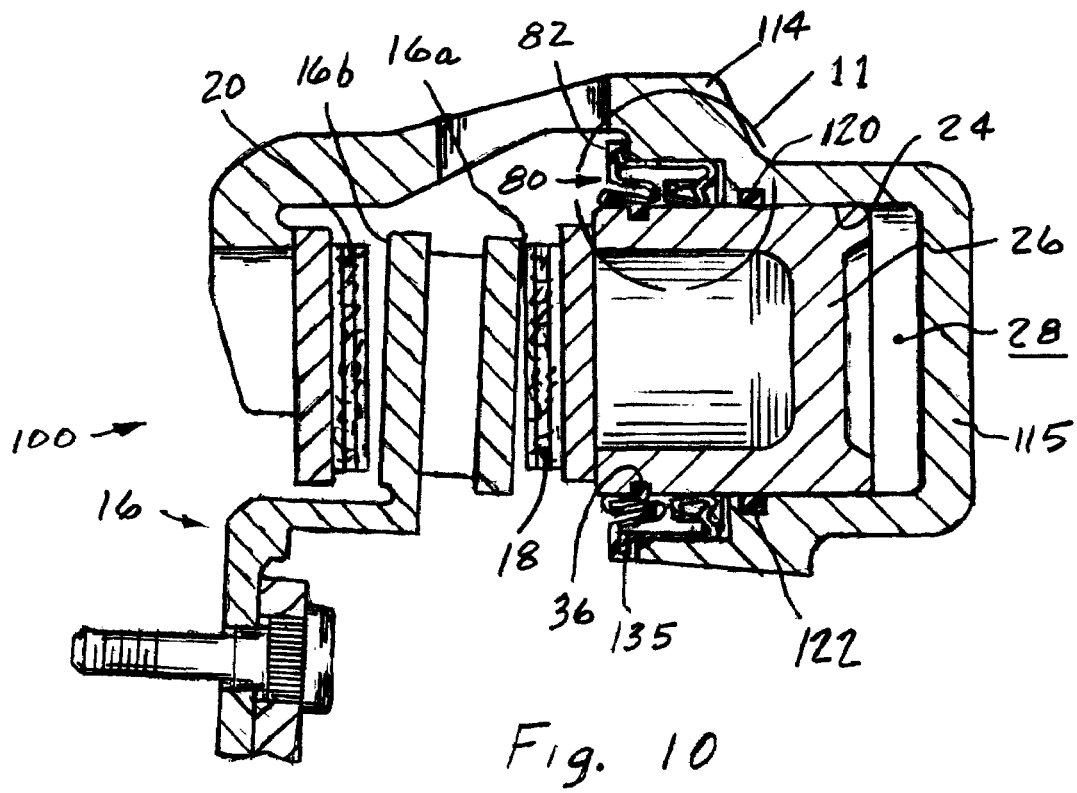
FIG. 10 is a sectional view of the disc brake of FIG. 2 illustrating a functional relationship that occurs in an event that the first side of the rotor engages the first friction member and moves the piston into the actuation chamber.
Figure 11:
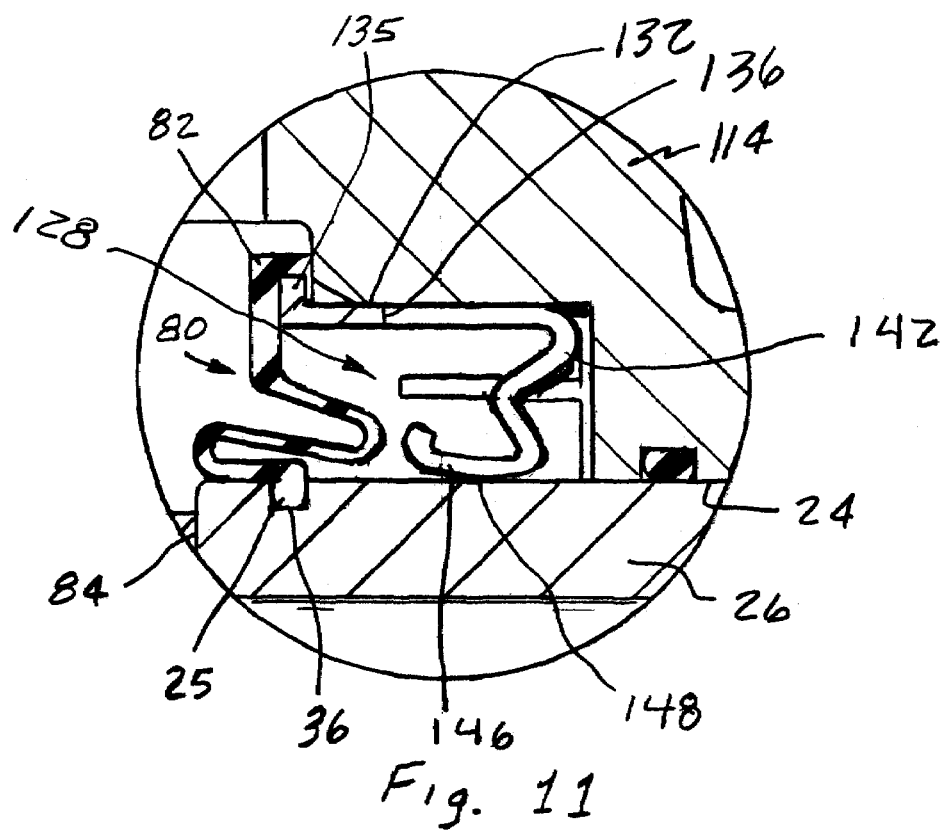
FIG. 11 is an enlarged view of the circumscribed section 11 of FIG. 10.

This running clearance is maintained by the retraction arrangement 130; however, under some circumstances the rotor 16 may engage the first 18 or second 20 friction members. When the rotor 16 engages the first friction member 18, piston 26 may be moved into bore 24 through a process commonly referred to as knock back, as illustrated in FIGS. 10 and 11. Should piston 26 be moved into bore 24, the engagement of face 148 on second arcuate section 146 increases and remains engaged with the peripheral surface on piston 26 due to the varying radius of curvature. This continued surface engagement between the second arcuate section 146 and piston 26 as piston 26 moves into bore 24 creates a greater radial force through the compression of the first arcuate section 142. This increase in radial force prevents slippage between face 148 and the peripheral surface on piston 26 and as a result a second axial spring force which increases the further the piston 26 moves into bore 24 is stored in each finger of the plurality of fingers 138, 138' ... 138". When rotor 16 returns to a radial aligned position as illustrated in FIG. 2, the second axial force retained in the fingers 138, 138' ... 138" acts on piston 26 and moves the first friction member 18 back toward rotor 16 and reestablish a desired running clearance that is essentially equivalent to a running clearance prior to the engagement of face 16a of the rotor 16 with the first friction member 18.

What is claimed is:

1. A disc brake having a caliper that straddles a rotor with a bore therein for receiving a piston to define an actuation chamber, said bore having a groove for retaining a seal that engages the piston to seal the actuation chamber from the surrounding environment, a first friction member connected to the piston and aligned with a first side of the rotor, a second friction member connected to the caliper and aligned with a second side of the rotor, said actuation chamber being presented with pressurized fluid from a source that acts on the piston and the caliper to develop an actuation force for respectively moving the first friction member from a first position of rest into engagement with the first side of the rotor and the second friction member from a second position of rest into engagement with the second side of the rotor to effect a brake application, and a retraction arrangement acting on the piston to return the first friction member to the first position of rest on termination of the brake application to define a desired running clearance between the first friction member and the first side of the rotor, said retraction arrangement being characterized by a cylindrical body having a first end and a second end with a plurality of inward projecting fingers that extends from the second end, each finger being defined by a cylindrical section that extends from the second end and transitions into a first arcuate section that transitions into a radial section that transitions into a second arcuate section with the second arcuate section engaging the piston to apply a radial spring force on the piston in the first position of rest, said second arcuate section of each finger being moved by the piston during a brake application such that each finger pivots with respect to the second end of the cylindrical member and as a result the radial spring force decreases while an axial spring force is created in each finger that increases with the movement of the piston from the position rest and on termination of the actuation force applied to the piston the axial spring force returns the piston and correspondingly the first friction member to the first position of rest.

2. The disc brake as recited in claim 1 wherein said second arcuate section of each finger moves with the piston until the axial spring force is equal to the radial spring force times the coefficient of friction between the second arcuate section and the piston and the piston thereafter independently moves to first friction member toward the first side of the rotor such that on termination of the actuation force on the piston, the stored axial spring force in the fingers return the piston to a new first position of rest.

3. The disc brake as recited in claim 1 wherein said second arcuate section of each finger moves with the piston and changes the application of the radial spring force applied to the piston through the second arcuate section as the second arcuate section pivots about the second end of the cylindrical body until the axial spring force is in equilibrium with the radial force spring times the coefficient of friction between the second arcuate section and the piston and after the equilibrium is achieved the piston may thereafter independently move the first friction member toward the first side of the rotor, axial spring force on termination of the actuation force on the piston returning the piston to a new first position of rest.

4. The disc brake as recited in claim 2 wherein said second arcuate section is coated with rubber to prevent damage of the piston through the engagement of the second arcuate section on the movement of the piston.

5. The disc brake as recited in claim 4 wherein said seal is an o-ring that prevents the pressurized fluid from acting on the retraction arrangement.

6. The disc brake as recited in claim 1 wherein said second arcuate section has a varying degree of curvature such that on an engagement of the first friction member by the first side of the rotor that moves the piston away from the first position of rest into the bore, the engagement of second arcuate section with the piston increases, the radial spring force increases and slippage is prevented and a second axial spring force is created in the fingers that returns the piston to a second position of rest on movement of the first side of the rotor away from the first friction member.

7. The disc brake as recited in claim 6 wherein said second axial spring force returns the first friction material to the second position of rest that is essentially equivalent to the first position of rest to compensate for any internal resistance.

8. The disc brake as recited in claim 5 wherein said retraction arrangement is further characterized by a boot that is connected to said first end of the cylindrical member and the piston to prevent contamination from entering the bore and effecting the relationship between the fingers and the piston.

9. The disc brake as recited in claim 1 wherein said second end of said cylindrical body further includes a plurality of outward extending tabs that are received in a second groove in said caliper to assist in retaining said retraction arrangement in said bore.

10. The disc brake as recited in claim 1 wherein said radial spring force and said axial spring force are a function of the internal resiliency of the cylindrical body independent from the pressurized fluid acting on the o-ring seal that engages the piston.

11. The disc brake as recited in claim 1 wherein a maximum radial spring force decreases in the cylindrical body while a axial spring force is correspondingly created in said cylindrical body during a brake application.

12. The disc brake as recited in claim 1 wherein a desired axial spring force created in said fingers remains substantially constant over an extended period of time.

\* \* \* \* \*